United States Patent
Yanai

[19]

[11] Patent Number: 5,844,646
[45] Date of Patent: Dec. 1, 1998

[54] THIN FILM LIQUID CRYSTAL DISPLAY WITH OPTICAL SHIELD HAVING WIDE PORTION OVER TRANSISTOR WITH NO ACUTE ANGLES

[75] Inventor: Koichi Yanai, Tokyo, Japan

[73] Assignee: NEC Corporation, Tokyo, Japan

[21] Appl. No.: 704,125

[22] Filed: Aug. 28, 1996

[30] Foreign Application Priority Data

Aug. 30, 1995 [JP] Japan .................................. 7-222304

[51] Int. Cl.⁶ .................................................. G02F 1/1333
[52] U.S. Cl. ............................................. 349/110; 349/44
[58] Field of Search ..................................... 349/110, 111, 349/38, 39, 44

[56] References Cited

U.S. PATENT DOCUMENTS 5,412,404  5/1995  Ishiwata et al. ......................... 349/110
5,561,440  10/1996  Kitajima et al. ........................ 349/110

Primary Examiner—William L. Sikes
Assistant Examiner—Kenneth Parker
Attorney, Agent, or Firm—Young & Thompson

[57] ABSTRACT

An optical shielding structure comprises both organic optical shielding films provided over a thin film transistor substrate and metal optical shielding films provided over an opposite substrate. Each of the organic optical shielding films comprises a straight stripe portion which both extends over the signal line and has a width at least equal to a distance between the pixel electrodes in the second direction, and expanding portions extending from the straight stripe portion to cover the thin film transistors, the expanding portions being tapered so that the each organic optical shielding film is shaped to be free of any acute angle corners and the right angle corner. Each of the metal optical shielding films both extends over the scanning line and has a width at least equal to a distance between the pixel electrodes in the first direction.

38 Claims, 4 Drawing Sheets

Rubbing Direction

THIN FILM LIQUID CRYSTAL DISPLAY WITH OPTICAL SHIELD HAVING WIDE PORTION OVER TRANSISTOR WITH NO ACUTE ANGLES

BACKGROUND OF THE INVENTION

The present invention relates to a thin film transistor liquid crystal display with an improved optical shielding film structure.

Generally, in the thin film transistor liquid crystal display, a liquid crystal layer is sandwiched between two transparent substrates such as glass substrates. One of the two transparent substrates is provided with thin film translators, for which reason this substrate is hereinafter referred to as a thin film transistor substrate and another is referred to as an opposite substrate.

The opposite substrate has an inner surface which is in contact in the liquid crystal layer and an outer surface. The opposite substrate is provided with a color filter on its outer surface. The opposite substrate is provided with a polarization plate on the color filter. The thin film transistor substrate also has an inner surface which is in contact in the liquid crystal layer and an outer surface. The thin film transistor substrate is also provided with a polarization plate on its outer surface. On inner surfaces of both the substrates, orientation films made of polyimide films are provided. The orientation films are subjected to rubbing so as to control the orientations of the liquid crystal molecules.

The inner surface of the thin film transistor substrate has a plurality of signal lines which extend over the same in parallel to each other at a constant distance as well as a plurality of scanning lines which extend over the same in parallel to each other at another constant distance but in a direction vertical to the signal lines. The signal lines and the scanning lines are formed at different levels so that the both are not in contact with each other. The signal lines and the scanning lines define arrays of rectangular-shaped matrixes. In each of the rectangular-shaped matrixes, a pixel electrode is provided except at one corner where a thin film transistor is provided. The thin film transistor has a gate which is connected to the scanning line, a drain which is connected to the signal line and a source which is connected to the pixel electrode so that the pixel electrode is connected via the thin film transistor to the signal line. The pixel electrode is normally made of indium thin oxide. The thin film transistor may comprise amorphous silicon. The thin film transistor performs ON-OFF switching operations in accordance with the signals transmitted on the scanning line. If the thin film transistor is in ON state, then the signal transmitted on the signal line is supplied via the thin film transistor to the pixel electrode. Namely, the voltage is applied to each pixel electrode whereby the electric field is caused.

The liquid crystal molecules over the pixel electrodes are controlled in those orientations by the electric field controlled by signals applied to the pixel electrodes, whilst the liquid crystal molecules over any region except for the pixel electrodes are free from the control by the electric field by signals applied to the pixel electrodes, for which reason even in a black display, a leakage of light appears form the uncontrolled liquid crystal molecules over the region except for the pixel electrodes. In order to solve this problem with leakage of light, it is necessary to provide an optical shield film over the region except for the pixel electrode for shielding the leakage of light. Normally, the optical shielding film is provided on either the thin film transistor substrate or the opposite substrate. If the optical shielding film is provided on the thin film transistor substrate, then the optical shielding film comprises a black matrix of a negative photo-resist film patterned, which includes a black or other colored pigment or a carbon black. By contrast, if the optical shielding film is provided on the thin film transistor substrate, then the optical shielding film comprises a black matrix made of a metal such as chromium.

FIGS. 1 and 2 are plane and fragmentary cross sectional elevation views illustrative of the conventional active matrix liquid crystal display panel with a thin film transistor, which is also disclosed in the Japanese laid-open patent publication No. 2-166422.

Thin film transistors and pixel electrodes are provided on a glass substrate 21. A gate electrode 22 of the thin film transistor is selectively formed on a predetermined area of the glass substrate 21. A gate insulation film 23 is formed to extend over the gate electrode 22 and over the top surface of the glass substrate 21. An undoped amorphous silicon layer 24 is selectively formed on the gate insulation film 23 to extend only over the gate electrode 22. A highly doped amorphous silicon layer 25 is formed on the undoped amorphous silicon layer 24 except for a center area of the undoped amorphous silicon layer 24. The highly doped amorphous silicon layer 25 is doped with phosphorus at a high impurity concentration so that the amorphous silicon takes a degenerate state. Pixel electrodes 26 made of indium tin oxide are selectively formed on the gate insulation film 23 so that the pixel electrodes 26 are spaced apart from the undoped amorphous silicon layer 24 being also formed on the gate insulation film 23. A drain electrode 27 is formed on a left half of the highly doped amorphous silicon layer 25. The drain electrode 27 is electrically connected to a signal line which runs over the glass substrate 21 and is not illustrated in FIG. 1. A source electrode 28 is formed to extend over a right half of the highly doped amorphous silicon layer 25 and within an aperture between the undoped amorphous silicon layer 24 and the pixel electrodes 26 as wall as over an end portion of the pixel electrodes 26 so that the source electrode 28 is in contact with the pixel electrode 26 whereby the source electrode 28 is electrically connected to the pixel electrode 26. The drain and source electrodes 27 and 28 are in contact with the highly doped amorphous silicon layer 25 in the degenerate state so as to ohmic contacts between the drain/source electrodes 27 and 28 and the highly doped amorphous silicon layer 25. The drain and source electrodes 27 and 28 do not extend over the center area of the undoped amorphous silicon layer 24 and are spaced apart from each other. A passivation insulation film 29 is formed to extend over an entire of the substrate. Namely, the passivation insulation film 29 extends over the pixel electrode 26, within an aperture between the pixel electrode 26 and the undoped amorphous silicon layer 24, on an outer side wall of the drain electrode 27, over the top surface of the drain electrode 27, and on an inner side wall of the drain electrode 27. The passivation insulation film 29 further extends over an exposed surface of the undoped amorphous silicon layer 24, on an inner side wall of the source electrode 28, over the top surface of the source electrode, on an outer side wall of the source electrode 28 and over the pixel electrode 26. An organic optical shielding film 30 is selectively formed on the passivation insulation film 29 so as to extend over the thin film transistor and do not extend over the pixel electrode 26. The organic optical shielding film 30 comprises a negative photo-resist film including acrylic resin, an optical polymerization initiator and a carbon black.

The above thin film transistor substrate is bonded via spacers to an opposite substrate so as to form a small gap between the thin film transistor substrate and the opposite substrate. A liquid crystal is injected into the small gap between the thin film transistor substrate and the opposite substrate to thereby form a liquid crystal display panel.

The organic optical shielding film extends to cover any regions except for the pixel electrodes as illustrated in FIG. 1. Namely, the organic optical shielding film have arrays of opening portions which are positioned over the pixel electrodes 26. The organic optical shielding film covers the signal lines 32, the scanning lines 31 and the thin film transistors 40. The opening portions of the organic optical shielding film are shaped in rectangular which is longer in a direction along the signal lines 32. If the liquid crystal display is used for note type personal computers, the size of the matrixes may be 50 micrometers×250 micrometers. Concretely, each of the opening portions of the organic optical shielding film is a rectangular which one corner is retreated inwardly and sheared by a square-shaped extending portion of the organic optical shielding film as illustrated in FIG. 1. Namely, each of the opening portions is shaped in hexagonal rectangular with six right angle corners.

As describes above, the organic optical shielding film is formed by patterning the negative photo-resist film, for example, by a development wherein the negative photo-resist film is subjected via the mask patterns to a developer. Actually, however, there has been a problem with a difficulty in having the developer seep into the negative photo-resist film but only its limited portions positioned at the right angle corners of the mask patterns. Of the negative photo-resist film, the limited portions positioned at the right angle corners of the mask patterns are unlikely to be seeped with the developer, for which reason the limited portions positioned at the right angle corners of the mask patterns are likely to remain without removal. As a result, residual portions exist at the six right angle corners of each of the opening portions of the patterned negative photo-resist film or the organic optical shielding film. This tendency is more remarkable as the size of the opening portions of the organic optical shielding film is small or as the thickness of the negative photo-resist film is large. The residual portions of the negative photo-resist film raises a problem in reduction in an opening rate of the organic optical shielding film. This problem causes a further problem in reduction in brightness of the display.

Further, the above conventional liquid crystal display has other problems as follows. As described above, the orientation films are subjected to the rubbing. This rubbing is normally made in a direction which has an angle of 45 degrees to either the signal lines or the scanning lines. The corners of the organic optical shielding film tends to receive insufficient rubbing. This insufficient rubbing raises other problem in difficulty in control of the orientation of the liquid crystal molecules positioned over the corners of the organic optical shielding film, for which reason, in the black display, a leakage of light appears at the corners of the organic optical shielding film. This causes a reduction in contrast of the display.

Furthermore, the above conventional liquid crystal display has other problems as follows. It is possible to provide an optical shielding film comprising a black matrix made of a metal such as chromium on the opposite substrate except for regions over the pixel electrodes formed on the thin film transistor substrate. If the black matrix made of a metal has a large area, this raises other problem in an increased reflectivity to the light. This increased reflectivity causes an external light image to be reflected by the metal optical shielding film and then projected on the screen of the display, resulting in a deterioration in quality of display.

In the above circumstances, it had been required to have the organic optical shielding film free of the unintended residual portions at the opening portions thereof even the size of the opening portions is small and the organic optical shielding film has the required thickness not so thin for ensuring a large opening rate of the organic optical shielding film to keep a sufficient brightness of the display.

Further, it had been required to allow the orientation film over an entire of the pixel electrodes to be subjected to a sufficient rubbing for facilitation in control of the orientation of the liquid crystal molecules even positioned over the corners of the organic optical shielding film so that in the black display no leakage of light appears even at the corners of the organic optical shielding film to thereby keep a high contrast of the display.

Furthermore, it had been required to achieve a possible reduction in area of the metal optical shielding film provided on the opposite electrode to reduce the reflectivity to an external light to thereby ensure a high quality of display.

SUMMARY OF THE INVENTION

Accordingly, it is an object of the present invention to provide an improved optical shielding structure provided in a liquid crystal display, which renders the liquid crystal display free from any problems as described above.

It is a further object of the present invention to provide an improved optical shielding structure provided in a liquid crystal display, which is free of any unintended residual portion at the opening portions thereof even the size of the opening portions is small and the organic optical shielding film has the required thickness not so thin.

It is a still further object of the present invention to provide an improved optical shielding structure provided in a liquid crystal display, which has a large opening rate to have the liquid crystal display keep a sufficient brightness of the display.

It is yet a further object of the present invention to provide an improved optical shielding structure provided in a liquid crystal display, which allow an orientation film over an entire of the pixel electrode to be subjected to a sufficient rubbing for facilitation in control of the orientation of the liquid crystal molecules even positioned over the corners of the organic optical shielding film.

It is a furthermore object of the present invention to provide an improved optical shielding structure provided in a liquid crystal display, which allows that in the black display no leakage of light appears even at the corners of the organic optical shielding film.

It is a furthermore object of the present invention to provide an improved optical shielding structure provided in a liquid crystal display, which render the liquid crystal display keep a high contrast.

It is a moreover object of the present invention to provide a liquid crystal display provided with an improved optical shielding structure which renders the liquid crystal display free from any problems as described above.

It is a further more object of the present invention to provide a liquid crystal display provided with an improved optical shielding structure which is free of any unintended residual portion at the opening portions thereof even the size of the opening portions is small and the organic optical shielding film has the required thickness not so thin.

It is still more object of the present invention to provide a liquid crystal display provided with an improved optical shielding structure which has a large opening rate to have the liquid crystal display keep a sufficient brightness of the display.

It is another further object of the present invention to provide a liquid crystal display provided with an improved optical shielding structure which allow an orientation film over an entire of the pixel electrode to be subjected to a sufficient rubbing for facilitation in control of the orientation of the liquid crystal molecules even positioned over the corners of the organic optical shielding film.

It is still another object of the present invention to provide a liquid crystal display provided with an improved optical shielding structure which allows that in the black display no leakage of light appears even at the corners of the organic optical shielding film.

It is yet another object of the present invention to provide a liquid crystal display provided with an improved optical shielding structure which render the liquid crystal display keep a high contrast.

The present invention provides an organic optical shielding film structure for a liquid crystal display. The organic optical shielding film structure is provided over a substrate on which a plurality of signal lines extend in parallel to each other with a first distance between them in a first direction as well as a plurality of scanning lines extend in parallel to each other with a second distance between them in a second direction substantially vertical to the first direction to form rectangular-shaped matrixes defined by the signal lines and the scanning lines. Each of the rectangular-shaped matrixes is formed with a thin film transistor positioned at its one corner and a pixel electrode extending over substantially an entire region of the each matrix except for the thin film transistor. The organic optical shielding film structure comprises a plurality of organic optical shielding films, each of which comprises a straight stripe portion which both extends over the signal line and has a width at least equal to a distance between the pixel electrodes in the second direction, and expanding portions extending from the straight stripe portion to cover the thin film transistors, wherein the expanding portions are tapered so that the each organic optical shielding film is shaped to be free of any acute angle corners and the right angle corner.

The present invention also provides another organic optical shielding film structure for a liquid crystal display. The organic optical shielding film structure is provided over a substrate on which a plurality of signal lines extend in parallel to each other with a first distance between them in a first direction as well as a plurality of scanning lines extend in parallel to each other with a second distance between them in a second direction substantially vertical to the first direction to form rectangular-shaped matrixes defined by the signal lines and the scanning lines. Each of the rectangular-shaped matrixes is formed with a thin film transistor positioned at its one corner and a pixel electrode extending over substantially an entire region of the each matrix except for the thin film transistor. The organic optical shielding film structure comprises a plurality of organic optical shielding films, each of which comprises a straight stripe portion which both extends over the scanning line and has a width at least equal to a distance between the pixel electrodes in the first direction, and expanding portions extending from the straight stripe portion to cover the thin film transistors, wherein the expanding portions are tapered so that the each organic optical shielding film is shaped to be free of any acute angle corners and the right angle corner.

The present invention also provides an optical shielding structure for a liquid crystal display. The optical shielding structure comprises both organic optical shielding films provided over a first substrate and metal optical shielding films provided over a second substrate. The first substrate is provided thereon with a plurality of signal lines extending in parallel to each other with a first distance between them in a first direction as well as a plurality of scanning lines extending in parallel to each other with a second distance between them in a second direction substantially vertical to the first direction to form rectangular-shaped matrixes defined by the signal lines and the scanning lines. Each of the rectangular-shaped matrixes is formed with a thin film transistor positioned at its one corner and a pixel electrode extending over substantially an entire region of the each matrix except for the thin film transistor. Each of the organic optical shielding films comprises a straight stripe portion which both extends over the signal line and has a width at least equal to a distance between the pixel electrodes in the second direction, and expanding portions extending from the straight stripe portion to cover the thin film transistors, the expanding portions being tapered so that the each organic optical shielding film is shaped to be free of any acute angle corners and the right angle corner. Each of the metal optical shielding films both extends over the scanning line and has a width at least equal to a distance between the pixel electrodes in the first direction.

The present invention also provides another optical shielding structure for a liquid crystal display. The optical shielding structure comprises both organic optical shielding films provided over a first substrate and metal optical shielding films provided over a second substrate. The first substrate is provided thereon with a plurality of signal lines extending in parallel to each other with a first distance between them in a first direction as well as a plurality of scanning lines extending in parallel to each other with a second distance between them in a second direction substantially vertical to the first direction to form rectangular-shaped matrixes defined by the signal lines find the scanning lines. Each of the rectangular-shaped matrixes is formed with a thin film transistor positioned at its one corner and a pixel electrode extending over substantially an entire region of the each matrix except for the thin film transistor. Each of the organic optical shielding films comprises a straight stripe portion which both extends over the scanning line and has a width at least equal to a distance between the pixel electrodes in the first direction, and expanding portions extending from the straight stripe portion to cover the thin film transistors, the expanding portions being tapered so that the each organic optical shielding film is shaped to be free of any acute angle corners and the right angle corner. Each of the metal optical shielding films both extends over the signal line and has a width at least equal to a distance between the pixel electrodes in the second direction.

The present invention also provides a liquid crystal display comprising the following elements. First and second substrates are provided to define a gap between them and sandwiching a liquid crystal layer. A plurality of signal lines extend over the first substrate in parallel to each other with a first distance between them in a first direction. A plurality of scanning lines extend over the second substrate in parallel to each other with a second distance between them in a second direction substantially vertical to the first direction to form rectangular-shaped matrixes defined by the signal lines and the scanning lines. A plurality of thin film transistors are provided in the rectangular-shaped matrixes at one corner thereof A plurality of pixel electrodes extend over substantially an entire region of the each matrix except for the thin film transistor. Each of the organic optical shielding films comprises a straight stripe portion which both extends over the signal line and has a width at least equal to a distance between the pixel electrodes in the second direction, and expanding portions extending from the straight stripe portion to cover the thin film transistors. The expanding portions are tapered so that the each organic optical shielding Elm is shaped to be free of any acute angle corners and the right angle corner. Each of the metal optical shielding films both extends over the scanning line and has a width at least equal to a distance between the pixel electrodes in the first direction.

The present invention also provides another liquid crystal display comprising the following elements. First and second substrates are provided to define a gap between them and sandwiching a liquid crystal layer. A plurality of signal lines extend over the first substrate in parallel to each other with a first distance between them in a first direction. A plurality of scanning lines extend over the second substrate in parallel to each other with a second distance between them in a second direction substantially vertical to the first direction to form rectangular-shaped matrixes defined by the signal lines and the scanning lines. A plurality of thin film transistors are provided in the rectangular-shaped matrixes at one corner thereof. A plurality of pixel electrodes extend over substantially an entire region of the each matrix except for the thin film transistor. Each of the organic optical shielding films comprises a straight stripe portion which both extends over the scanning line and has a width at least equal to a distance between the pixel electrodes in the first direction, and expanding portions extending from the straight stripe portion to cover the thin film transistors. The expanding portions are tapered so that the each organic optical shielding film is shaped to be free of any acute angle corners and the right angle corner. Each of the metal optical shielding films both extends over the signal line and has a width at least equal to a distance between the pixel electrodes in the second directions

BRIEF DESCRIPTIONS OF THE DRAWINGS

Preferred embodiments according to the present invention will be described in detail with reference to the accompanying drawings.

DISCLOSURE OF THE INVENTION

Figure 1:
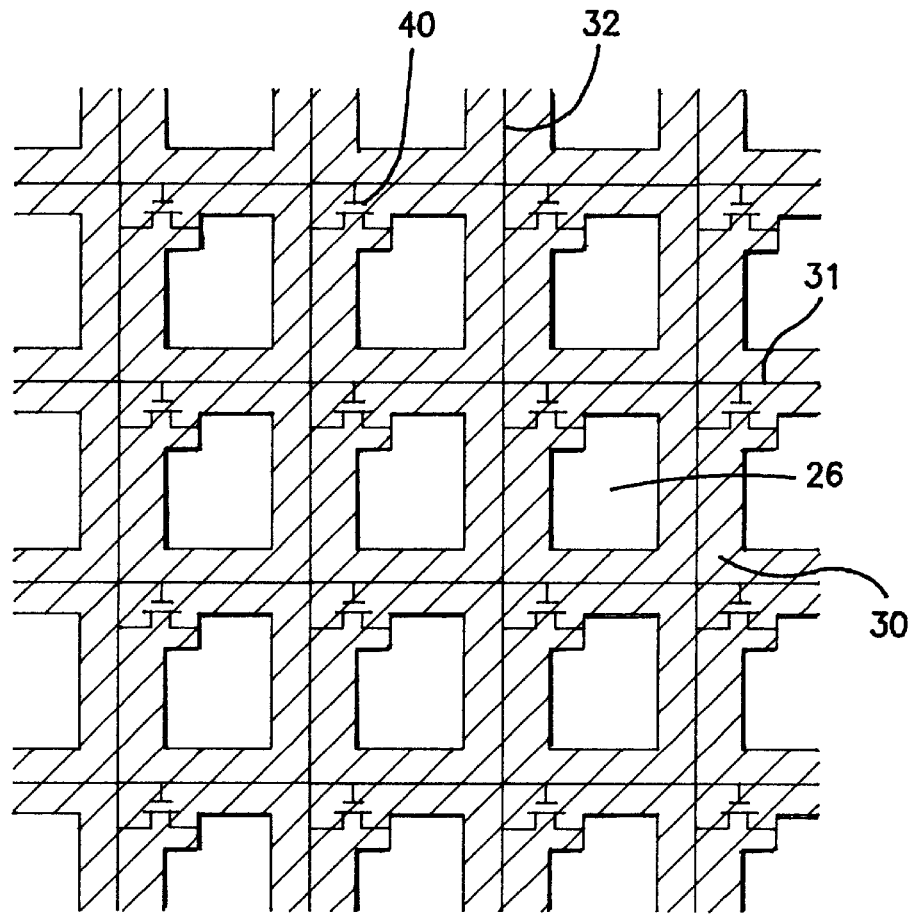
FIG. 1 is a fragmentary plane view illustrative of the conventional organic optical shielding films provided on the thin film transistor substrate of the liquid crystal display.
Figure 2:
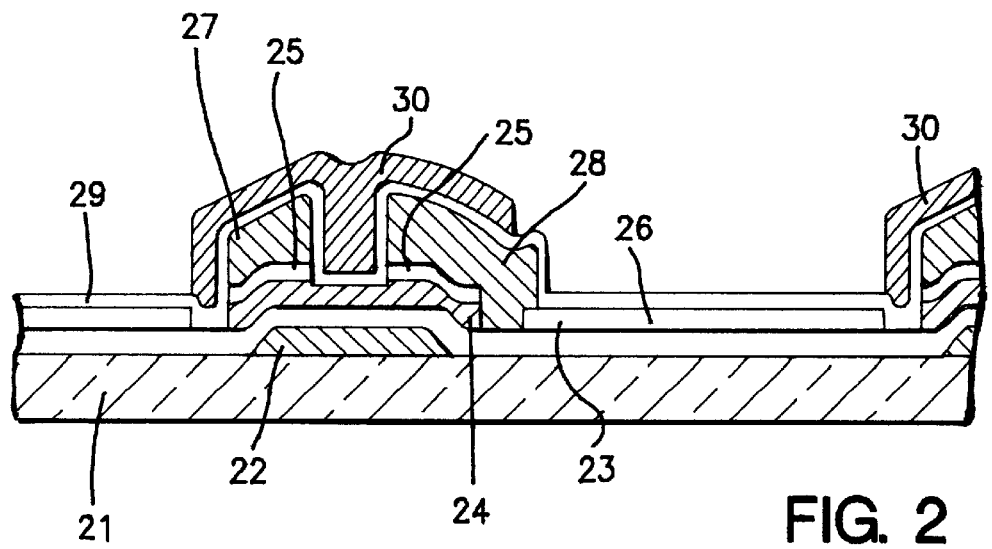
FIG. 2 is a fragmentary cross sectional elevation view illustrative of the conventional structure of the thin film transistor substrate of the liquid crystal display.

The present invention provides an organic optical shielding film structure for a liquid crystal display. The organic optical shielding film structure is provided over a substrate on which a plurality of signal lines extend in parallel to each other with a first distance between them in a first direction as well as a plurality of scanning lines extend in parallel to each other with a second distance between them in a second direction substantially vertical to the first direction to form rectangular-shaped matrixes defined by the signal lines and the scanning lines. Each of the rectangular-shaped matrixes is formed with a thin film transistor positioned at its one corner and a pixel electrode extending over substantially an entire region of the each matrix except for the thin film transistor. The organic optical shielding film structure comprises a plurality of organic optical shielding films, each of which comprises a straight stripe portion which both extends over the signal line and has a width at least equal to a distance between the pixel electrodes in the second direction, and expanding portions extending from the straight stripe portion to cover the thin film transistors, wherein the expanding portions are tapered so that the each organic optical shielding film is shaped to be free of any acute angle corners and the right angle corner.

It is preferable that the expanding portions are in the form of a trapezoid having a bottom side in contact with the straight portion and a top side with an obtuse angle to oblique sides thereof.

It is further preferable that the obtuse angles defined between the top side and the oblique sides are in the range of 120 degrees to 150 degrees.

It is furthermore preferable that the obtuse angles defined between the top side and the oblique sides are the same angle.

It is moreover preferable that the obtuse angle defined between the top side and the oblique sides is 135 degrees.

The present invention was made by providing an improved organic optical shielding film free of any tight angle corner such as the right angle corner or the acute angle corners. This has the organic optical shielding film free of the unintended residual portions at the opening portions thereof even the size of the opening portions is small and the organic optical shielding film has the required thickness not so thin for ensuring a large opening rate of the organic optical shielding film to keep a sufficient brightness of the display.

Further, the above structure allows the orientation film over an entire of the pixel electrodes to be subjected to a sufficient rubbing for facilitation in control of the orientation of the liquid crystal molecules even positioned over the corners of the organic optical shielding film so that in the black display no leakage of light appears even at the corners of the organic optical shielding film to thereby keep a high contrast of the display.

Furthermore, the above structure achieves a possible reduction in area of the metal optical shielding film provided on the opposite electrode to reduce the reflectivity to an external light to thereby ensure a high quality of display.

The present invention also provides another organic optical shielding film structure for a liquid crystal display. The organic optical shielding film structure is provided over a substrate on which a plurality of signal lines extend in parallel to each other with a first distance between them in a first direction as well as a plurality of scanning lines extend in parallel to each other with a second distance between them in a second direction substantially vertical to the first direction to form rectangular-shaped matrixes defined by the signal lines and the scanning lines. Each of the rectangular-shaped matrixes is formed with a thin film transistor positioned at its one corner and a pixel electrode extending over substantially an entire region of the each matrix except for the thin film transistor. The organic optical shielding film structure composes a plurality of organic optical shielding films, each of which comprises a straight stripe portion which both extends over the scanning line and has a width at least equal to a distance between the pixel electrodes in the first direction, and expanding portions extending from the straight stripe portion to cover the thin film transistors, wherein the expanding portions are tapered so that the each organic optical shielding film is shaped to be free of any acute angle corners and the right angle corner.

It is preferable that the expanding portions are in the form of a trapezoid having a bottom side in contact with the straight portion and a top side with an obtuse angle to oblique sides thereof.

It is further preferable that the obtuse angles defined between the top side and the oblique sides are in the range of 120 degrees to 150 degrees.

It is furthermore preferable that the obtuse angles defined between the top side and the oblique sides are the same angle.

It is moreover preferable that the obtuse angle defined between the top side and the oblique sides is 135 degrees.

The above present invention was also made by providing an improved organic optical shielding film free of any tight angle corner such as the right angle corner or the acute angle corners. This has the organic optical shielding film free of the unintended residual portions at the opening portions thereof even the size of the opening portions is small and the organic optical shielding film has the required thickness not so thin for ensuring a large opening rate of the organic optical shielding film to keep a sufficient brightness of the display.

Further, the above structure allows the orientation film over an entire of the pixel electrodes to be subjected to a sufficient rubbing for facilitation in control of the orientation of the liquid crystal molecules even positioned over the corners of the organic optical shielding film so that in the black display no leakage of light appears even at the corners of the organic optical shielding film to thereby keep a high contrast of the display.

Furthermore, the above structure achieves a possible reduction in area of the metal optical shielding film provided on the opposite electrode to reduce the reflectivity to an external light to thereby ensure a high quality of display.

The present invention also provides an optical shielding structure for a liquid crystal display. The optical shielding structure comprises both organic optical shielding films provided over a first substrate and metal optical shielding films provided over a second substrate. The first substrate is provided thereon with a plurality of signal lines extending in parallel to each other with a first distance between them in a first direction as well as a plurality of scanning lines extending in parallel to each other with a second distance between them in a second direction substantially vertical to the first direction to form rectangular-shaped matrixes defined by the signal lines and the scanning lines. Each of the rectangular-shaped matrixes is formed with a thin film transistor positioned at its one corner and a pixel electrode extending over substantially an entire region of the each matrix except for the thin film transistor. Each of the organic optical shielding films comprises a straight stripe portion which both extends over the signal line and has a width at least equal to a distance between the pixel electrodes in the second direction, and expanding portions extending from the straight stripe portion to cover the thin film transistors, the expanding portions being tapered so that the each organic optical shielding film is shaped to be See of any acute angle corners and the right angle corner. Each of the metal optical shielding films both extends over the scanning line and has a width at least equal to a distance between the pixel electrodes in the first direction.

It is preferable that each of the metal optical shielding films discontinuously extend except over the organic optical shielding films.

It is further preferable that each of the metal optical shielding films continuously extend to overlap the organic optical shielding films.

It is furthermore preferable that the expanding portions are in the form of a trapezoid having a bottom side in contact with the straight portion and a top side with an obtuse angle to oblique sides thereof.

It is moreover preferable that the obtuse angles defined between the top side and the oblique sides are in the range of 120 degrees to 150 degrees.

It is still more preferable that the obtuse angles defined between the top side and the oblique sides are the same angle.

It is still further preferable that the obtuse angle defined between the top side and the oblique sides is 135 degrees.

The above present invention was also made by providing an improved organic optical shielding film free of any tight angle corner such as the right angle corner or the acute angle corners. This has the organic optical shielding film free of the unintended residual portions at the opening portions thereof even the-size of the opening portions is small and the organic optical shielding film has the required thickness not so thin for ensuring a large opening rate of the organic optical shielding film to keep a sufficient brightness of the display.

Further, the above structure allows the orientation film over an entire of the pixel electrodes to be subjected to a sufficient rubbing for facilitation in control of the orientation of the liquid crystal molecules even positioned over the corners of the organic optical shielding film so that in the black display no leakage of light appears even at the corners of the organic optical shielding film to thereby keep a high contrast of the display.

Furthermore, the above structure achieves a possible reduction in area of the metal optical shielding film provided on the opposite electrode to reduce the reflectivity to an external light to thereby ensure a high quality of display.

The present invention also provides another optical shielding structure for a liquid crystal display. The optical shielding structure comprises both organic optical shielding films provided over a first substrate and metal optical shielding films provided over a second substrate. The first substrate is provided thereon with a plurality of signal lines extending in parallel to each other with a first distance between them in a first direction as well as a plurality of scanning lines extending in parallel to each other with a second distance between them in a second direction substantially vertical to the first direction to form rectangular-shaped matrixes defined by the signal lines and the scanning lines. Each of the rectangular-shaped matrixes is formed with a thin film transistor positioned at its one corner and a pixel electrode extending over substantially an entire region of the each matrix except for the thin film transistor. Each of the organic optical shielding films comprises a straight stripe portion which both extends over the scanning line and has a width at least equal to a distance between the pixel electrodes in the first direction, and expanding portions extending from the straight stripe portion to cover the thin film transistors, tie expanding portions being tapered so that the each organic optical shielding film is shaped to be free of any acute angle corners and the right angle corner Each of the metal optical shielding films both extends over the signal line and has a width at least equal to a distance between the pixel electrodes in the second direction.

It is preferable that each of the metal optical shielding films discontinuously extend except over the organic optical shielding films.

It is further preferable that each of the metal optical shielding films continuously extend to overlap the organic optical shielding films.

It is furthermore preferable that the expanding portions are in the form of a trapezoid having a bottom side in contact with the straight portion and a top side with an obtuse angle to oblique sides thereof.

It is moreover preferable that the obtuse angles defined between the top side and the oblique sides are in the range of 120 degrees to 150 degrees.

It is still more preferable that the obtuse angles defined between the top side and the oblique sides are the same angle.

It is still further preferable that the obtuse angle defined between the top side and the oblique sides is 135 degrees.

The above present invention was also made by providing an improved organic optical shielding film free of any tight angle corner such as the right angle corner or the acute angle corners. This has the organic optical shielding film free of the unintended residual portions at the opening portions thereof even the size of the opening portions is small and the organic optical shielding film has the required thickness not so thin for ensuring a large opening rate of the organic optical shielding film to keep a sufficient brightness of the display.

Further, the above structure allows the orientation film over an entire of the pixel electrodes to be subjected to a sufficient rubbing for facilitation in control of the orientation of the liquid crystal molecules even positioned over the corners of the organic optical shielding film so that in the black display no leakage of light appears even at the corners of the organic optical shielding film to thereby keep a high contrast of the display.

Furthermore, the above structure achieves a possible reduction in area of the metal optical shielding film provided on the opposite electrode to reduce the reflectivity to an external light to thereby ensure a high quality of display.

The present invention also provides a liquid crystal display comprising the following elements. First and second substrates are provided to define a gap between them and sandwiching a liquid crystal layer. A plurality of signal lines extend over the first substrate in parallel to each other with a first distance between them in a first direction. A plurality of scanning lines extend over the second substrate in parallel to each other with a second distance between them in a second direction substantially vertical to the first direction to form rectangular-shaped matrixes defined by the signal lines and the scanning lines. A plurality of thin film transistors are provided in the rectangular-shaped matrixes at one corner thereof. A plurality of pixel electrodes extend over substantially an entire region of the each matrix except for the thin film transistor. Each of the organic optical shielding films comprises a straight stripe portion which both extends over the signal line and has a width at least equal to a distance between the pixel electrodes in the second direction, and expanding portions extending from the straight stripe portion to cover the thin film transistors. The expanding portions are tapered so that the each organic optical shielding film is shaped to be free of any acute angle corners and the right angle corner. Each of the metal optical shielding films both extends over the scanning line and has a width at least equal to a distance between the pixel electrodes in the first direction.

It is preferable that each of the metal optical shielding films discontinuously extend except over the organic optical shielding films.

It is further preferable that each of the metal optical shielding films continuously extend to overlap the organic optical shielding films.

It is furthermore preferable that the expanding portions are in the form of a trapezoid having a bottom side in contact with the straight portion and a top side with an obtuse angle to oblique sides thereof.

It is moreover preferable that the obtuse angles defined between the top side and the oblique sides are in the range of 120 degrees to 150 degrees.

It is still more preferable that the obtuse angles defined between the top side and the oblique sides are the same angle.

It is still further preferable that the obtuse angle defined between the top side and the oblique sides is 135 degrees.

The above present invention was also made by providing an improved organic optical shielding film free of any tight angle corner such as the right angle corner or the acute angle corners. This has the organic optical shielding film free of the unintended residual portions at the opening portions thereof even the size of the opening portions is small and the organic optical shielding film has the required thickness not so thin for ensuring a large opening rate of the organic optical shielding film to keep a sufficient brightness of the display.

Further, the above structure allows the orientation film over an entire of the pixel electrodes to be subjected to a sufficient rubbing for facilitation in control of the orientation of the liquid crystal molecules even positioned over the corners of the organic optical shielding film so that in the black display no leakage of light appears even at the corners of the organic optical shielding film to thereby keep a high contrast of the display.

Furthermore, the above structure achieves a possible reduction in area of the metal optical shielding film provided on the opposite electrode to reduce the reflectivity to an external light to thereby ensure a high quality of display.

The present invention also provides another liquid crystal display comprising the following elements. First and second substrates are provided to define a gap between them and sandwiching a liquid crystal layer. A plurality of signal lines extend over the first substrate in parallel to each other with a first distance between them in a first direction. A plurality of scanning lines extend over the second substrate in parallel to each other with a second distance between them in a second direction substantially vertical to the first direction to form rectangular-shaped matrixes defined by the signal lines and the scanning lines. A plurality of thin film transistors are provided in the rectangular-shaped matrixes at one corner thereof. A plurality of pixel electrodes extend over substantially an entire region of the each matrix except for the thin film transistor. Each of the organic optical shielding films comprises a straight stripe portion which both extends over the scanning line and has a width at least equal to a distance between the pixel electrodes in the first direction, and expanding portions extending from the straight stripe portion to cover the thin film transistors. The expanding portions are tapered so that the each organic optical shielding film is shaped to be free of any acute angle corners and the right angle corner. Each of the metal optical shielding films both extends over the signal line and has a width at least equal to a distance between the pixel electrodes in the second direction.

It is preferable that each of the metal optical shielding films discontinuously extend except over the organic optical shielding films.

It is further preferable that each of the metal optical shielding films continuously extend to overlap the organic optical shielding films.

It is furthermore preferable that the expanding portions are in the form of a trapezoid having a bottom side in contact with the straight portion and a top side with an obtuse angle to oblique sides thereof.

It is moreover preferable that the obtuse angles defined between the top side and the oblique sides are in the range of 120 degrees to 150 degrees.

It is moreover preferable that the obtuse angles defined between the top side and the oblique sides are the same angle.

It is still more preferable that the obtuse angle defined between the top side and the oblique sides is 135 degrees.

The above present invention was also made by providing an improved organic optical shielding film free of any tight angle corner such as the right angle corner or the acute angle corners. This has the organic optical shielding film free of the unintended residual portions at the opening portions thereof even the size of the opening portions is small and the organic optical shielding film has the required thickness not so thin for ensuring a large opening rate of the organic optical shielding film to keep a sufficient brightness of the display.

Further, the above structure allows the orientation film over an entire of the pixel electrodes to be subjected to a sufficient rubbing for facilitation in control of the orientation of the liquid crystal molecules even positioned over the corners of the organic optical shielding film so that in the black display no leakage of light appears even at the corners of the organic optical shielding film to thereby keep a high contrast of the display.

Furthermore, the above structure achieves a possible reduction in area of the metal optical shielding film provided on the opposite electrode to reduce the reflectivity to an external light to thereby ensure a high quality of display.

PREFERRED EMBODIMENTS

Figure 3:
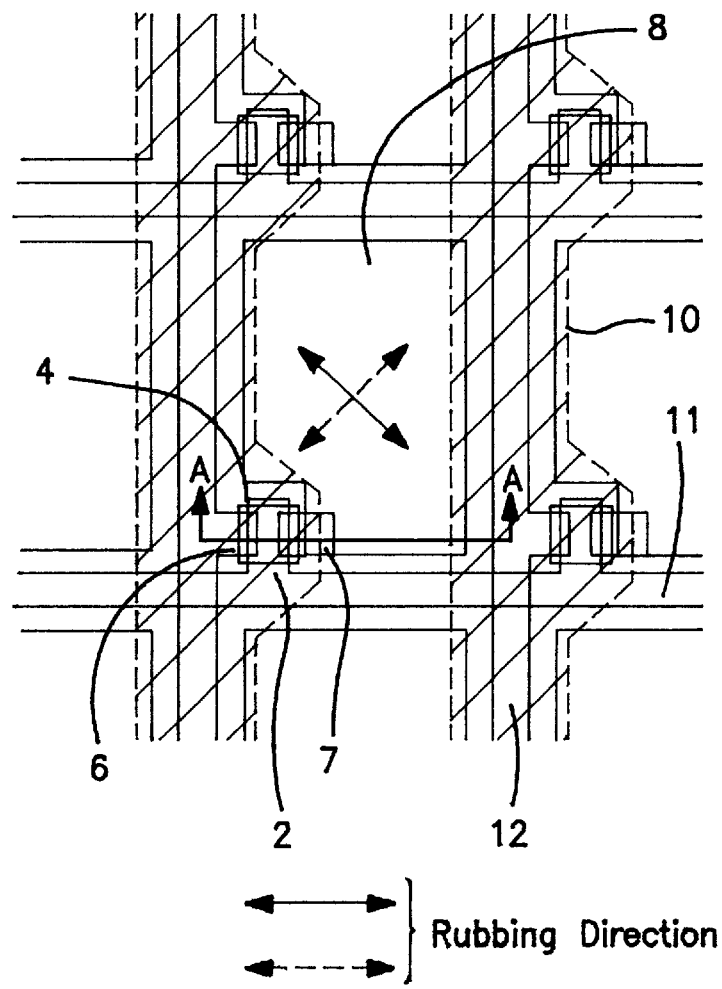
FIG. 3 is a fragmentary plane view illustrative of an improved organic optical shielding film provided on the thin film transistor substrate of the liquid crystal display in a first embodiment according to the present invention.
Figure 4:
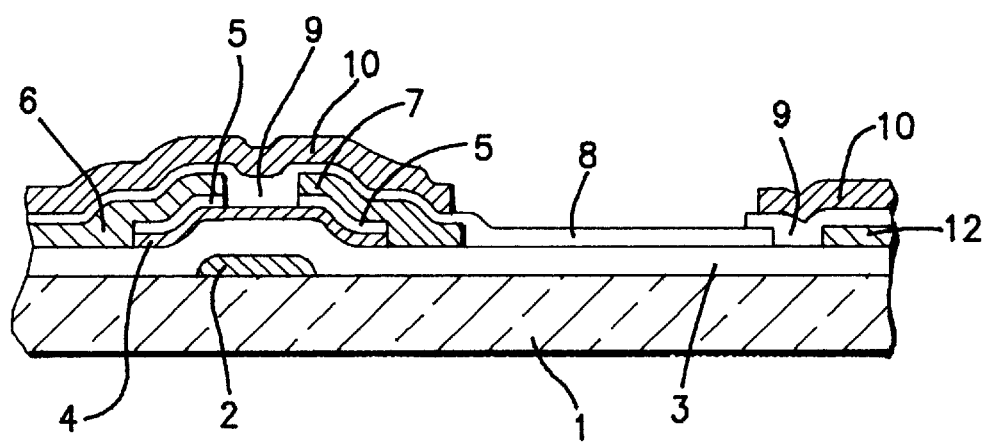
FIG. 4 is a fragmentary cross sectional elevation view illustrative of an improved structure of the thin film transistor substrate of the liquid crystal display in a first embodiment according to the present invention.
Figure 5:
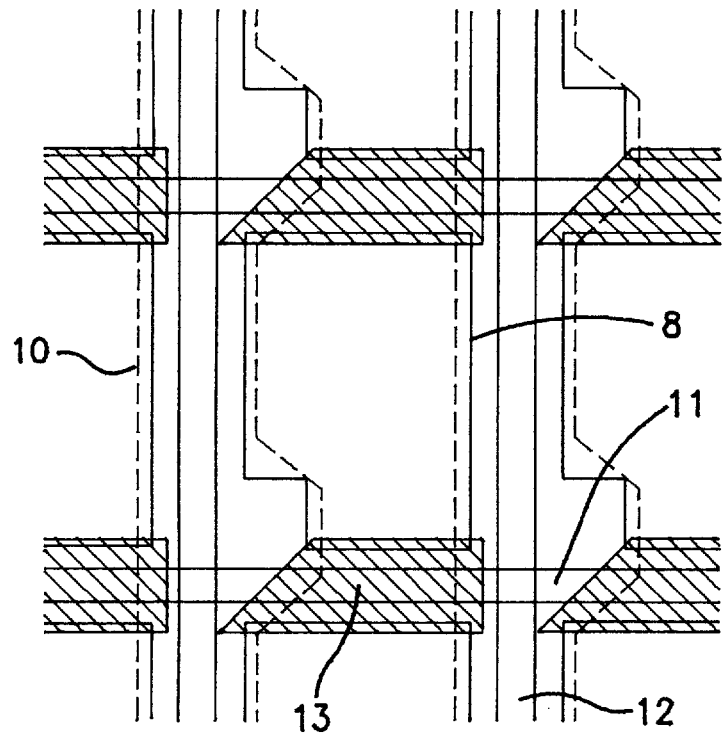
FIG. 5 is a fragmentary plane view illustrative of an improved metal optical shielding film provided on the opposite substrate of the liquid crystal display in a first embodiment according to the present invention.

A first embodiment according to the present invention will be described with reference to FIGS. 3, 4 and 5. FIG. 3 is a plane view illustrative of a thin film transistor substrate of a liquid crystal display in this embodiment according to the present invention. FIG. 4 is a fragmentary cross sectional elevation taken along A—A line in FIG. 3 illustrative of a thin film transistor substrate of a liquid crystal display in this embodiment according to the present invention. FIG. 5 is a plane view illustrative of an opposite substrate over an opposite substrate of a liquid crystal display in this embodiment according to the present invention.

With reference to FIGS. 3 and 4, an optical shielding structure comprises both organic optical shielding films 10 provided over a thin film transistor substrate and metal optical shielding films 13 provided over an opposite substrate. The thin film transistor substrate is provided thereon with a plurality of signal lines 12 extending in parallel to each other with a first distance between them in a first direction as well as a plurality of scanning lines 11 extending in parallel to each other with a second distance between them in a second direction substantially vertical to the first direction to form rectangular-shaped matrixes defined by the signal lines 12 and the scanning lines 11. Each of the rectangular-shaped matrixes is formed with a thin film transistor positioned at its one corner and a pixel electrode 8 extending over substantially an entire region of the each matrix except for the thin film transistor. The thin film transistor has a gate electrode 2 which is connected to the scanning line 11, a drain electrode 6 which is connected to the signal line 12 and a source electrode which is connected to the pixel electrode 2. The pixel electrode 2 is connected via the thin film transistor to the signal line 13.

Each of the organic optical shielding films 10 comprises a straight stripe portion which both extends over the signal line 12 and has a width slightly larger than a distance between the pixel electrodes 2 in the second direction, and expanding portions extending from the straight stripe portion to cover the thin film transistors. The expanding portions are tapered so that the each organic optical shielding film is shaped to be free of any acute angle corners and the right angle corner. The expanding portions are in the form of a trapezoid having a bottom side in contact with the straight portion and a top side with an obtuse angle to oblique sides thereof. Whereas the obtuse angles are defined between the top side and the oblique sides may be in the range of 120 degrees to 150 degrees, the obtuse angle defined between the top side and the oblique sides is 135 degrees. The obtuse angles defined between the top side and the oblique sides are the same angle. Each of the metal optical shielding films 13 both extends over the scanning line and has a width slightly larger than a distance between the pixel electrodes in the first direction. In this embodiment, in order to reduce area of the metal optical shielding films, the metal optical shielding films discontinuously extend except over the organic optical shielding films as illustrated in FIG. 5, even it is possible that each of the metal optical shielding films continuously extend to overlap the organic optical shielding films.

With reference to FIG. 4, on a single glass substrate 1, the thin film transistors and the pixel electrodes 8 are provided. Each of the pixel electrodes 8 is selectively provided on a predetermined area of the glass substrate 1, wherein the predetermined area is separated from an area on which each thin film transistor is formed. A gate electrode 2 is selectively provided on a predetermined area of the glass substrate 1. A gate insulation film 3 is provided which extends over the glass substrate 1 and the gate electrode 3. The gate insulation film 3 has a hillock over the gate electrode 2. The pixel electrode 8 is selectively formed on an other predetermined region of the gate oxide film 3. An undoped amorphous silicon layer 4 is selectively provided on the gate insulation film 3 over the gate electrode 2 and its adjacent portion so that the undoped amorphous silicon layer 4 extends over the hillock and gradually sloped portions around the hillock. Highly doped amorphous silicon films 5 are formed on the undoped amorphous, silicon layer 4 so that the highly doped amorphous silicon films 5 extend over the end portion of the top of the hillock as well as the gradually sloped portions of the hillock. The highly doped amorphous silicon films 6 extends on the undoped amorphous silicon layer 4 except for the center portion of the top of the hillock. The highly doped amorphous silicon films 6 are doped with phosphorus at a high impurity concentration so that amorphous silicon is in the degenerate state. The drain electrode 6 is provided to extend over the highly doped amorphous silicon film 5 positioned at the left half side of the hillock and over the flat portion of the gate insulation film 3. The source electrode 7 is provided to extend over the highly doped amorphous silicon film 5 positioned at the right half side of the hillock and over the flat portion of the gate insulation film 3 so that he source electrode 7 is in contact with the pixel electrode 8. The drain and source electrodes 6 and 7 do not extend over the center area of the top of the hillock to have the top portion of the undoped amorphous silicon film 4 partially exposed. The inter-layer insulator 9 is selectively provided to extend over the drain electrode 6. The inter-layer insulator 9 continuously extends within an aperture positioned over the undoped amorphous silicon layer 4 and between the source and drain electrodes 7 and 8. The inter-layer insulator 9 further continuously extends over the source electrode 7. The organic optical shielding layer 10 is formed on the inter-layer insulator 9. The organic optical shielding layer 10 covers the outer half portion of the metal optical shielding layer 13.

The gate electrode 2, the scanning lines 11, the drain electrode 6, the source electrode 7 and the signal lines 12 may be formed as follows. A chromium film is grown by a sputtering of chromium. A positive photo-resist film is applied on the chromium film for subsequent photo-lithography.

The pixel electrodes 9 may be formed as follows. A transparent conductive film such as indium thin oxide film is grown by sputtering method. A positive photo-resist film is applied on the transparent conductive film such as indium thin oxide film for subsequent photo-lithography.

The gate insulation film 3, the undoped amorphous silicon layer 4 and the highly doped amorphous silicon film 5 may be formed as follows. Chromium metal films are continuously grown by a chemical vapor deposition method for subsequent patterning.

The organic optical shielding film 10 may be formed as follows. A negative resist film including black pigment is used for patterning the same. Alternatively, a polyaniline containing or black pigment containing solution is applied for dry thereof. A positive photo-resist film is applied for exposure and subsequent development before the used photo-resist film is removed. As black pigments, various organic and inorganic pigments and mixtures of carbon blacks are available. As the negative photo-resists comprising an acrylic resin dispersed with black pigments, CK-2000, CK-5002 CK-7000 may, for example, commercially available from Fuji-Hunt Electronics Technology Co., or the other negative photo-resists K-505, BK-412 are also commercially available from Tokyo Applied Chemical Industries Co. As a black pigment solution for positive photo-resist patterning, BLACK-20 is commercially available from Nikon Synthetic Rubber Co.

The metal optical shielding film 13 may be formed as follows. A chromium metal film is grown by a chemical vapor deposition method for subsequent patterning.

As described above, each of the organic optical shielding films 10 comprises a straight stripe portion which both extends over the signal line 12 and has a width slightly larger than a distance between the pixel electrodes 2 in the second direction, and expanding portions extending from the straight stripe portion to cover the thin film transistors. The expanding portions are tapered so that the each organic optical shielding film is shaped to be free of any acute angle corners and the right angle corner, for example, in the form of a trapezoid having a bottom side in contact with the straight portion and a top side with an obtuse angle of 135 degrees to oblique sides thereof The above present invention was also made by providing the above improved organic optical shielding film 10 free of any tight angle corner such as the right angle corner or the acute angle corners. This has the organic optical shielding film free of the unintended residual portions at the opening portions thereof even the size of the opening portions is small and the organic optical shielding film has the required thickness not so thin for ensuring a large opening rate of the organic optical shielding film 10 to keep a sufficient brightness of the display.

Further, the above structure of the organic optical shielding film 10 allows the orientation film over an entire of the pixel electrodes to be subjected to a sufficient rubbing in either directions represented by real line arrow mark or broken line arrow mark for facilitation in control of the orientation of the liquid crystal molecules even positioned over the corners of the organic optical shielding film so that in the black display no leakage of light appears even at the corners of the organic optical shielding film to thereby keep a high contrast of the display.

Each of the metal optical shielding films 13 both extends over the scanning line and has a width slightly larger than a distance between the pixel electrodes in the first direction. In this embodiment, in order to reduce area of the metal optical shielding films, the metal optical shielding films discontinuously extend except over the organic optical shielding films as illustrated in FIG. 5. This structure of the metal optical shielding film 13 achieves a possible reduction in area of the metal optical shielding film provided on the opposite electrode to reduce the reflectivity to an external light to thereby ensure a high quality of display.

Figure 6:
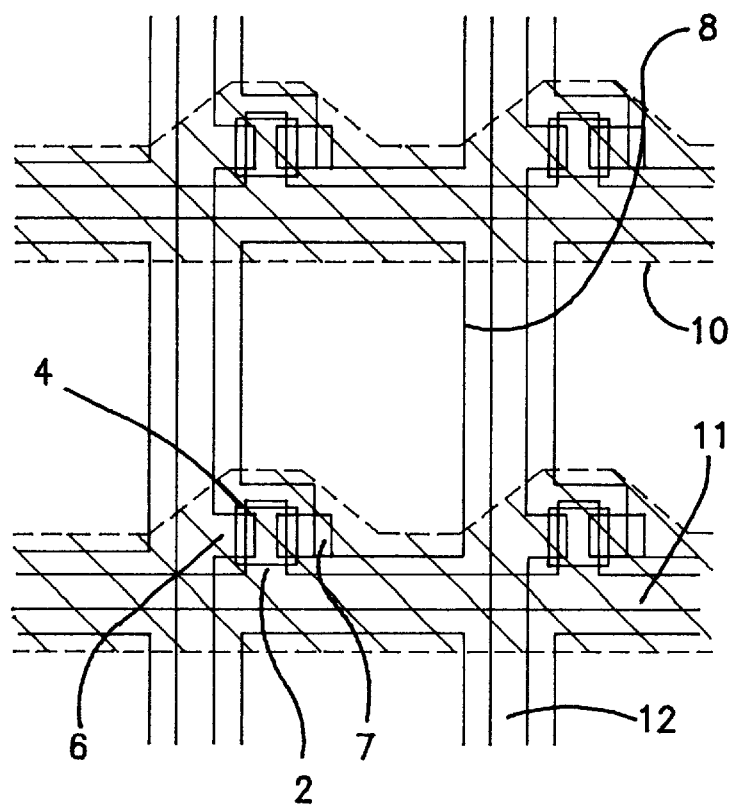
FIG. 6 is a fragmentary plane view illustrative of an improved organic optical shielding film provided on the thin film transistor substrate of the liquid crystal display in a second embodiment according to the present invention.
Figure 7:
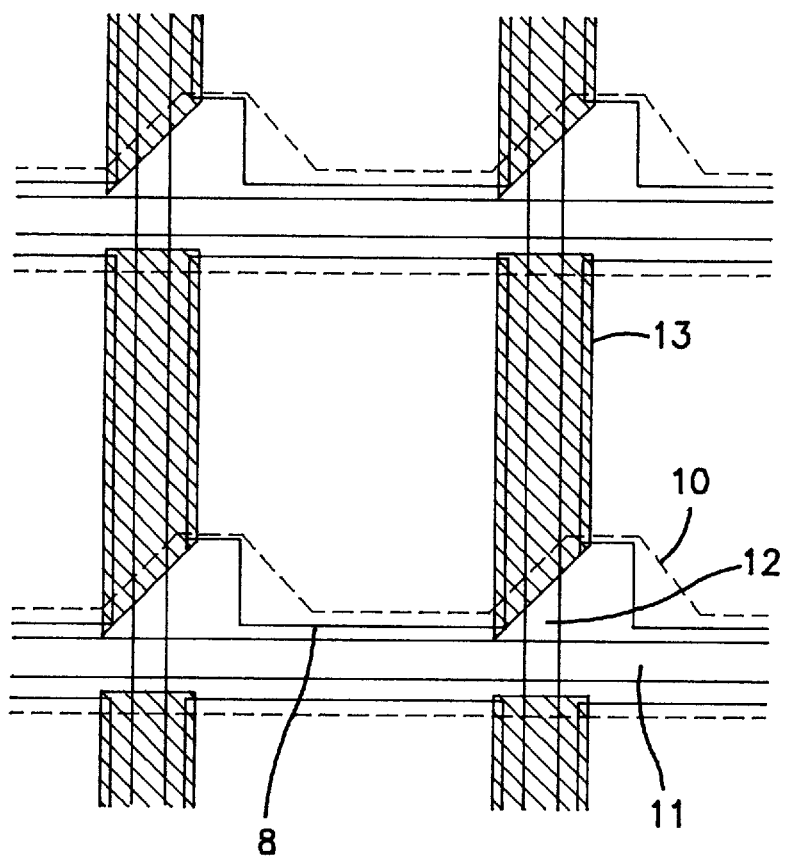
FIG. 7 is a fragmentary plane view illustrative of an improved metal optical shielding film provided on the opposite substrate of the liquid crystal display in a second embodiment according to the present invention.

A second embodiment according to the present invention will be described with reference to FIGS. 6 and 7. FIG. 6 is a plane view illustrative of a thin film transistor substrate of a liquid crystal display in this embodiment according to the present invention. FIG. 7 is a plane view illustrative of an opposite substrate over an opposite substrate of a liquid crystal display in this embodiment according to the present invention.

With reference to FIGS. 6 and 7, an optical shielding structure comprises both organic optical shielding films 10 provided over a thin film transistor substrate and metal optical shielding films 13 provided over an opposite substrate. The thin film transistor substrate is provided thereon with a plurality of signal lines 12 extending in parallel to each other with a first distance between them in a first direction as well as a plurality of scanning lines 11 extending in parallel to each other with a second distance between them in a second direction substantially vertical to the first direction to form rectangular-shaped matrixes defined by the signal lines 12 and the scanning lines 11. Each of the rectangular-shaped matrixes is formed with a thin film transistor positioned at its one corner and a pixel electrode 8 extending over substantially an entire region of the each matrix except for the thin film transistor. The thin film transistor has a gate electrode 2 which is connected to the scanning line 11, a drain electrode 6 which is connected to the signal line 12 and a source electrode which is connected to the pixel electrode 2. The pixel electrode 2 is connected via the thin film transistor to the signal line 13.

Each of the organic optical shielding films 10 comprises a straight stripe portion which both extends over the scanning line 13 and has a width slightly larger than a distance between the pixel electrodes 2 in the first direction, and expanding portions extending from the straight stripe portion to cover the thin film transistors. The expanding portions are tapered so that the each organic optical shielding film is shaped to be free of any acute angle corners and the right angle corner. The expanding portions are in the form of a trapezoid having a bottom side in contact with the straight portion and a top side with an obtuse angle to oblique sides thereof. Whereas the obtuse angles are defined between the top side and the oblique sides may be in the range of 120 degrees to 150 degrees, the obtuse angle defined between the top side and the oblique sides is 135 degrees. The obtuse angles defined between the top side and the oblique sides are the same angle. Each of the metal optical shielding films 13 both extends over the signal line 12 and has a width slightly larger than a distance between the pixel electrodes in the second direction. In this embodiment, in order to reduce area of the metal optical shielding films, the metal optical shielding films discontinuously extend except over the organic optical shielding films as illustrated in FIG. 7, even it is possible that each of the metal optical shielding films continuously extend to overlap the organic optical shielding films.

The gate electrode 2, the scanning lines 11, the drain electrode 6, the source electrode 7 and the signal lines 12 may be formed as follows. A chromium film is grown by a sputtering of chromium. A positive photo-resist film is applied on the chromium film for subsequent photo-lithography.

The pixel electrodes 8 may be formed as follows. A transparent conductive film such as indium thin oxide film is grown by sputtering method. A positive photo-resist film is applied on the transparent conductive film such as indium thin oxide film for subsequent photo-lithography.

The gate insulation film 3, the undoped amorphous silicon layer 4 and the highly doped amorphous silicon film 5 may be formed as follows. Chromium metal films are continuously grown by a chemical vapor deposition method for subsequent patterning.

The organic optical shielding film 10 may be formed as follows. A negative resist film including black pigment is used for patterning the same. Alternatively, a polyaniline containing or black pigment containing solution is applied for dry thereof. A positive photo-resist film is applied for exposure and subsequent development before the used photo-resist film is removed. As black pigments, various organic and inorganic pigments and mixtures of carbon blacks are available. As the negative photo-resists comprising an acrylic resin dispersed with black pigments, CK-2000, CK-5002 CK-7000 may, for example, commercially available from Fuji-Hunt Electronics Technology Co., or the other negative photo-resists K-505, BK-412 are also commercially available from Tokyo Applied Chemical Industries Co. As a black pigment solution for positive photo-resist patterning, BLACK-20 is commercially available from Nikon Synthetic Rubber Co.

The metal optical shielding film 13 may be formed as follows. A chromium metal film is grown by a chemical vapor deposition method for subsequent patterning.

As described above, each of the organic optical shielding films 10 comprises a straight stripe portion which both extends over the scanning line 13 and has a width slightly larger than a distance between the pixel electrodes 2 in the first direction, and expanding portions extending from the straight stripe portion to cover the thin film transistors. The expanding portions are tapered so that the each organic optical shielding film is shaped to be free of any acute angle corners and the right angle corner, for example, in the form of a trapezoid having a bottom side in contact with the straight portion and a top side with an obtuse angle of 135 degrees to oblique sides thereof.

The above present invention was also made by providing the above improved organic optical shielding film 10 free of any tight angle corner such as the right angle corner or the acute angle corners. This has the organic optical shielding film free of the unintended residual portions at the opening portions thereof even the size of the opening portions is small and the organic optical shielding film has the required thickness not so thin for ensuring a large opening rate of the organic optical shielding film 10 to keep a sufficient brightness of the display.

Further, the above structure of the organic optical shielding film 10 allows the orientation film over an entire of the pixel electrodes 8 to be subjected to a sufficient rubbing for facilitation in control of the orientation of the liquid crystal molecules even positioned over the corners of the organic optical shielding film 10 so that in the black display no leakage of light appears even at the corners of the organic optical shielding film 10 to thereby keep a high contrast of the display.

Each of the metal optical shielding films 13 both extends over the signal line 12 and has a width slightly larger than a distance between the pixel electrodes 8 in the second direction. In this embodiment, in order to reduce area of the metal optical shielding films, the metal optical shielding films discontinuously extend except over the organic optical shielding films as illustrated in FIG. 7. This structure of the metal optical shielding film 13 achieves a possible reduction in area of the metal optical shielding film provided on the opposite electrode to reduce the reflectivity to an external light to thereby ensure a high quality of display.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims any modifications of the present invention which fall within the spirit and scope of the present invention.

What is claimed is:

1. An organic optical shielding film structure for a liquid crystal display, said organic optical shielding film structure being provided over a substrate on which a plurality of signal lines extend in parallel to each other with a first distance between them in a first direction as well as a plurality of scanning lines extend in parallel to each other with a second distance between them in a second direction substantially vertical to said first direction to form rectangular-shaped matrixes defined by said signal lines and said scanning lines, each of said rectangular-shaped matrixes being formed with a thin film transistor positioned at its one corner and a pixel electrode extending over substantially an entire region of said each matrix except for said thin film transistor, said organic optical shielding film structure comprising a plurality of organic optical shielding films, wherein each of which comprises:
- a straight stripe portion which both extends over said signal line and has a width at least equal to a distance between said pixel electrodes in said second direction; and
- expanding portions extending from said straight stripe portion to cover said thin film transistors, said expanding portions being tapered so that said each organic optical shielding film is shaped to be free of any acute angle corners and the right angle corner.

2. The organic optical shielding film structure as claimed in claim 1, wherein said expanding portions are in the form of a trapezoid having a bottom side in contact with said straight portion and a top side with an obtuse angle to oblique sides thereof.

3. The organic optical shielding film structure as claimed in claim 2, wherein said obtuse angles defined between said top side and said oblique sides are in the range of 120 degrees to 150 degrees.

4. The organic optical shielding film structure as claimed in claim 3, wherein said obtuse angles defined between said top side and said oblique sides are the same angle.

5. The organic optical shielding film structure as claimed in claim 4, wherein said obtuse angle defined between said top side and said oblique sides is 135 degrees.

6. An organic optical shielding film structure for a liquid crystal display, said organic optical shielding film structure being provided over a substrate on which a plurality of signal lines extend in parallel to each other with a first distance between them in a first direction as well as a plurality of scanning lines extend in parallel to each other with a second distance between them in a second direction substantially vertical to said first direction to form rectangular-shaped matrixes defined by said signal lines and said scanning lines, each of said rectangular-shaped matrixes being formed with a thin film transistor positioned at its one corner and a pixel electrode extending over substantially an entire region of said each matrix except for said thin film transistor, said organic optical shielding film structure comprising a plurality of organic optical shielding films,
wherein each of which comprises:
- a straight stripe portion which both extends over said scanning line and has a width at least equal to a distance between said pixel electrodes in said first direction; and
- expanding portions extending from said straight stripe portion to cover said thin film transistors, said expanding portions being tapered so that said each organic optical shielding film is shaped to be free of any acute angle corners and the right angle corner.

7. The organic optical shielding film structure as claimed in claim 6, wherein said expanding portions are in the form of a trapezoid having a bottom side in contact with said straight portion and a top side with an obtuse angle to oblique sides thereof.

8. The organic optical shielding film structure as claimed in claim 7, wherein said obtuse angles defined between said top side and said oblique sides are in the range of 120 degrees to 150 degrees.

9. The organic optical shielding film structure as claimed in claim 8, wherein said obtuse angles defined between said top side and said oblique sides are the same angle.

10. The organic optical shielding film structure as claimed in claim 9, wherein said obtuse angle defined between said top side and said oblique sides is 135 degrees.

11. An optical shielding structure for a liquid crystal display, said optical shielding structure comprising both organic optical shielding films provided over a first substrate and metal optical shielding films provided over a second substrate, said first substrate being provided thereon with a plurality of signal lines extending in parallel to each other with a first distance between them in a first direction as well as a plurality of scanning lines extending in parallel to each other with a second distance between them in a second direction substantially vertical to said first direction to form rectangular-shaped matrixes defined by said signal lines and said scanning lines, each of said rectangular-shaped matrixes being formed with a thin film transistor positioned at its one corner and a pixel electrode extending over substantially an entire region of said each matrix except for said thin film transistor,
wherein each of said organic optical shielding films comprises:
- a straight stripe portion which both extends over said signal line and has a width at least equal to a distance between said pixel electrodes in said second direction; and
- expanding portions extending from said straight stripe portion to cover said thin film transistors, said expanding portions being tapered so that said each organic optical shielding film is shaped to be free of any acute angle corners and the right angle corner, and
wherein each of said metal optical shielding films both extends over said scanning line and has a width at least equal to a distance between said pixel electrodes in said first direction.

12. The optical shielding structure as claimed in claim 11, wherein each of said metal optical shielding films discontinuously extend except over said organic optical shielding films.

13. The optical shielding structure as claimed in claim 11, wherein each of said metal optical shielding films continuously extend to overlap said organic optical shielding films.

14. The optical shielding structure as claimed in claim 11, wherein said expanding portions are in the form of a trapezoid having a bottom side in contact with said straight portion and a top side with an obtuse angle to oblique sides thereof.

15. The optical shielding structure as claimed in claim 14, wherein said obtuse angles defined between said top side and said oblique sides are in the range of 120 degrees to 150 degrees.

16. The optical shielding structure as claimed in claim 15, wherein said obtuse angles defined between said top side and said oblique sides are the same angle.

17. The optical shielding structure as claimed in claim 16, wherein said obtuse angle defined between said top side and said oblique sides is 135 degrees.

18. An optical shielding structure for a liquid crystal display, said optical shielding structure comprising both organic optical shielding films provided over a first substrate and metal optical shielding films provided over a second substrate, said first substrate being provided thereon with a plurality of signal lines extending in parallel to each other with a first distance between them in a first direction as well as a plurality of scanning lines extending in parallel to each other with a second distance between them in a second direction substantially vertical to said first direction to form rectangular-shaped matrixes defined by said signal lines and said scanning lines, each of said rectangular-shaped matrixes being formed with a thin film transistor positioned at its one corner and a pixel electrode extending over substantially an entire region of said each matrix except for said thin film transistor, wherein each of said organic optical shielding films comprises:

a straight stripe portion which both extends over said scanning line and has a width at least equal to a distance between said pixel electrodes in said first direction; and expanding portions extending from said straight stripe portion to cover said thin film transistors, said expanding portions being tapered so that said each organic optical shielding film is shaped to be free of any acute angle corners and the right angle corner, and wherein each of said metal optical shielding films both extends over said signal line and has a width at least equal to a distance between said pixel electrodes in said second direction.

19. The optical shielding structure as claimed in claim 18, wherein each of said metal optical shielding films discontinuously extend except over said organic optical shielding films.

20. The optical shielding structure as claimed in claim 18, wherein each of said metal optical shielding films continuously extend to overlap said organic optical shielding films.

21. The optical shielding structure as claimed in claim 18, wherein said expanding portions are in the form of a trapezoid having a bottom side in contact with said straight portion and a top side with an obtuse angle to oblique sides thereof.

22. The optical shielding structure as claimed in claim 21, wherein said obtuse angles defined between said top side and said oblique sides are in the range of 120 degrees to 150 degrees.

23. The optical shielding structure as claimed in claim 22, wherein said obtuse angles defined between said top side and said oblique sides are the same angle.

24. The optical shielding structure as claimed in claim 23, wherein said obtuse angle defined between said top side and said oblique sides is 135 degrees.

25. A liquid crystal display comprising:

first and second substrates being provided to define a gap between them and sandwiching a liquid crystal layer;

a plurality of signal lines extending over said first substrate in parallel to each other with a first distance between them in a first direction;

a plurality of scanning lines extending over said second substrate in parallel to each other with a second distance between them in a second direction substantially vertical to said first direction to form rectangular-shaped matrixes defined by said signal lines and said scanning lines;

a plurality of thin film transistors being provided in said rectangular-shaped matrixes at one corner thereof;

a plurality of pixel electrodes extending over substantially an entire region of said each matrix except for said thin film transistor, wherein each of said organic optical shielding films comprises:

a straight stripe portion which both extends over said signal line and has a width at least equal to a distance between said pixel electrodes in said second direction; and expanding portions extending from said straight stripe portion to cover said thin film transistors, said expanding portions being tapered so that said each organic optical shielding film is shaped to be free of any acute angle corners and the right angle corner, and wherein each of said metal optical shielding films both extends over said scanning line and has a width at least equal to a distance between said pixel electrodes in said first direction.

26. The liquid crystal display as claimed in claim 25, wherein each of said metal optical shielding films discontinuously extend except over said organic optical shielding films.

27. The liquid crystal display as claimed in claim 25, wherein each of said metal optical shielding films continuously extend to overlap said organic optical shielding films.

28. The liquid crystal display as claimed in claim 25, wherein said expanding portions are in the form of a trapezoid having a bottom side in contact with said straight portion and a top side with an obtuse angle to oblique sides thereof.

29. The liquid crystal display as claimed in claim 28, wherein said obtuse angles defined between said top side and said oblique sides are in the range of 120 degrees to 150 degrees.

30. The liquid crystal display as claimed in claim 29, wherein said obtuse angles defined between said top side and said oblique sides are the same angle.

31. The liquid crystal display as claimed in claim 30, wherein said obtuse angle defined between said top side and said oblique sides is 135 degrees.

32. A liquid crystal display comprising:

first and second substrates being provided to define a gap between them and sandwiching a liquid crystal layer;

a plurality of signal lines extending over said first substrate in parallel to each other with a first distance between them in a first direction;

a plurality of scanning lines extending over said second substrate in parallel to each other with a second distance between them in a second direction substantially vertical to said first direction to form rectangular-shaped matrixes defined by said signal lines and said scanning lines;

a plurality of thin film transistors being provided in said rectangular-shaped matrixes at one corner thereof;

a plurality of pixel electrodes extending over substantially an entire region of said each matrix except for said thin film transistor, wherein each of said organic optical shielding films comprises:

a straight stripe portion which both extends over said scanning line and has a width at least equal to a distance between said pixel electrodes in said first direction; and expanding portions extending from said straight stripe portion to cover said thin film transistors, said expanding portions being tapered so that said each organic optical shielding film is shaped to be free of any acute angle corners and the right angle corner, and wherein each of said total optical shielding films both extends over said signal line and has a width at least equal to a distance between said pixel electrodes in said second direction.

33. The liquid crystal display as claimed in claim 32, wherein each of said metal optical shielding films discontinuously extend except over said organic optical shielding films.

34. The liquid crystal display as claimed in claim 32, wherein each of said metal optical shielding films continuously extend to overlap said organic optical shielding films.

35. The liquid crystal display as claimed in claim 32, wherein said expanding portions are in the form of a trapezoid having a bottom side in contact with said straight portion and a top side with an obtuse angle to oblique sides thereof.

36. The liquid crystal display as claimed in claim 35, wherein said obtuse angles defined between said top side and said oblique sides are in the range of 120 degrees to 150 degrees.

37. The liquid crystal display as claimed in claim 36, wherein said obtuse angles defined between said top side and said oblique sides are the same angle.

38. The liquid crystal display as claimed in claim 37, wherein said obtuse angle defined between said top side and said oblique sides is 135 degrees.

* * * * *